ELECTRONIC INTEGRATION APPARATUS

Original Filed Aug. 27, 1964 2 Sheets-Sheet 1

INVENTORS
EDWARD O. GILBERT
CHARLES H. SINGLE

BY Richard D. Stephens
ATTORNEY

ELECTRONIC INTEGRATION APPARATUS

Original Filed Aug. 27, 1964 2 Sheets-Sheet 2

INVENTORS
EDWARD O. GILBERT
CHARLES H. SINGLE

BY Richard D. Stephens
ATTORNEY

United States Patent Office 3,484,594

Patented Dec. 16, 1969

3,484,594
ELECTRONIC INTEGRATION APPARATUS

Edward O. Gilbert and Charles H. Single, Ann Arbor, Mich., assignors to Applied Dynamics, Inc., Ann Arbor, Mich., a corporation of Michigan

Application Aug. 23, 1966, Ser. No. 574,468, now Patent No. 3,381,230, dated Apr. 30, 1968, which is a continuation of application Ser. No. 392,489, Aug. 27, 1964. Divided and this application Jan. 24, 1968, Ser. No. 700,158

Int. Cl. G06g *7/18, 7/12*

U.S. Cl. 235—183 9 Claims

ABSTRACT OF THE DISCLOSURE

An electronic Miller integrator having an amplifier and a computing capacitor and provided with a positive feedback network around a portion of the amplifier, with the network having a transfer function equal to the difference between the amplifier-capacitor transfer function and *l/p*, where *p* is the differential operator *d/dt*, with the feedback network having a plurality of RC branches to compensate for absorption in the computing capacitor, a resistive branch to compensate for capacitor leakage and amplifier gain limitations, a capacitor-diode branch to compensate for the voltage coefficient of the computing capacitor, and a small capacitor having a large temperature coefficient to compensate for the temperature coefficient of the computing capacitor, and an adjustable voltage divider connected to apply an input current separately from adjustment of the amplifier voltage offset.

This application is a division of application Ser. No. 574,468 filed Aug. 23, 1966, now Patent No. 3,381,230, which is in turn a continuation of application Ser. No. 392,489 filed Aug. 27, 1964 and now abandoned.

This invention relates to electronic integrators, and more particularly to improved electronic integrator circuits having greater accuracy. In the analog computer, automatic control and instrumentation art, integration is commonly accomplished by so-called Miller integrators, which comprise operational amplifiers having a feedback capacitor connected between the amplifier output and input terminals, and one or more input resistors connected between one or more input signal sources and the amplifier input terminal. If plural input signals are applied to the plural resistor inputs of such integrators, the integrators sum the signals as well as integrating them with respect to time. If various adjustments are made to the operational amplifier to minimize errors due to voltage offset and current input to the operational amplifier, the accuracy of integration is usually limited chiefly by the characteristics of the feedback capacitor. Because of the computing accuracies required, the prior art in general has resorted to the use of expensive capacitors, usually utilizing a solid dielectric, and frequently such capacitors have been housed in temperature-controlled environmental chambers in order to improve their electrical characteristics. Despite such elaborate and expensive measures, the limitations of the best-available computing capacitors have resulted in integration inaccuracies amounting to a major source of computer dynamic error.

While the prior art usually has attempted to overcome capacitor limitation by improvements in capacitor manufacture, the present invention, on the other hand, is based on a principle of acknowledging the capacitor limitations, and of providing compensating circuitry which overcomes the effects of such limitations. Thus it is a primary object of the present invention to provide an improved electronic integrator circuit having greater computational accuracy.

In the prior art various attempts have been made to compensate for various errors caused by integrating capacitor limitations. One important limitation of highest-quality computing capacitors is their absorption, or "soaking effect," which for a typical polystyrene dielectric results in changes of capacitance with frequency of the order of .02% per decade, and a dissipation factor of about .02%. Consequent computation errors of .03% to .01% result in certain transient solutions. Patent No. 2,745,007, for example, shows the use of a compensating network following an electronic integrator in an attempt to compensate for capacitor absorption effects. Such circuits suffer from the serious disadvantage that their output impedances are high, and further from the disadvantage that they are incapable of compensating for capacitor leakage resistance or error due to finite amplifier gain. Patent No. 3,047,808 is similar except that it utilizes an absorption compensating network preceding the integrator. While it need not have high output impedance, that circuit too is incapable of compensating for error due to capacitor leakage resistance and furthermore, the circuit must be repeated for each additional input to be summed. The present invention overcomes both of these disadvantages, and hence it is an additional object of the present invention to provide an electronic integrator circuit compensated for capacitor errors which both has low output impedance and which is compensated for capacitor leakage resistance.

The above-mentioned prior art compensation schemes are further inadequate in that they attempt to compensate for capacitor absorption with a single compensating network. As will be explained below, plural compensating networks are necessary in order to compensate for the effects of capacitor absorption over a substantial frequency range, and in accordance with the invention, the required compensating networks for absorption compensation over a wide range of frequencies are easily provided, without lowering the input impendance or raising the output impedance of the electronic integrator.

General purpose electronic analog computers are used to solve a variety of problems, and the variety between problems requires that different numbers of input signals be applied at different times to be summed and integrated. If a known number and known types of input signals were always applied to an integrator circuit, the effects of amplifier voltage offset and current input on integrator accuracy could be adequately compensated for by conventional balance controls commonly used with operational amplifiers. The requirement to vary the number of input signals, however, has prevented the use of any long term compensation, or has resulted in many amplifiers having to be re-adjusted very frequently. It is a further object of this invention to provide electronic integrator circuits incorporating independent voltage offset and current input balancing means in order that such integrator circuits need not be re-adjusted every time their input signal configurations are changed.

One of the important limitations of computing capacitors is their leakage resistance. With non-zero voltage, the greater the leakage of the capacitor, the more the integrator circuit will drift or discharge when it is intended to be constant. High quality presently-available computing capacitors of 1.0 microfarad capacity have a DC leakage resistance of approximately $5\times10^{12}$ ohms, and such leakage resistance can result in appreciable computational error. In accordance with the present invention, a circuit is provided which compensates for or cancels out error due to leakage, as well as error due to capacitor absorption effects, and errors due to voltage offsets and current inputs. Thus it is another object of the invention to provide an electronic integrator circuit having greater freedom from drift due to capacitor leakage resistance.

An electronic integrator could integrate theoretically accurately only if the gain of its amplifier were infinite, and hence a further error has resulted in prior art electronic integrators because the gains of their amplifiers were necessarily limited. The error due to finite amplifier gain is similar to that due to capacitor leakage resistance. In accordance with the present invention, a circuit is provided which may completely compensate for error due to finite amplifier gain.

Attempts have been made in the prior art to compensate for amplifier finite gain and capacitor leakage resistance, one such attempt being shown in Patent No. 3,137,790, issued June 16, 1964 to Berry. Such a system suffers from the disadvantages that it requires at least two extra amplifiers, that even then the compensation is necessarily only approximate, and that a very large number of additional amplifiers are necessary if the leakage and finite gain errors are to be substantially completely cancelled. Also, such systems do not compensate in any way for capacitor absorption. In accordance with the present invention, the errors due to leakage resistance and finite gain may be completely cancelled out by the provision of a single simple resistance circuit. Further, by the provision of further simple resistance-capacitance circuits, errors due to capacitor absorption may be compensated for.

Thus it is a further, and a very important object of the present invention, to provide an improved electronic integrator circuit in which all of the above-mentioned sources of computation error may be simply and accurately compensated for in a single, reliable and very economical manner, thereby to provide an electronic integrator having markedly improved accuracy.

The present invention, generally speaking, compensates for a number of the errors of the usual electronic integrator by providing, in addition to the usual negative feedback connection through the integrating capacitor, one or more positive feedback paths through a network having resistances and capacitances selected according to the integrating capacitor limitations and the amplifier gain limitation. Such positive feedback may be provided easily and economically, and adjusted to compensate for the integrator errors with as great an accuracy as may be desired.

In its broadest aspects, the invention is applicable not only to compensate for capacitor limitations and amplifier finite gain limitations, but also for other limitations of the total integrator circuit. The transfer function of an ideal integrator is $l/p$. By providing positive feedback through a network having an "error transfer function," where the error transfer function is the difference between the actual integrator transfer function and $l/p$. substantially all of the errors of the integrator circuit may be compensated for, including characteristics due to the voltage coefficient and the temperature coefficient of the capacitor.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention, reference should be had to the following detailed description taken in connection with the accompanying drawing, in which.

Figure 1:
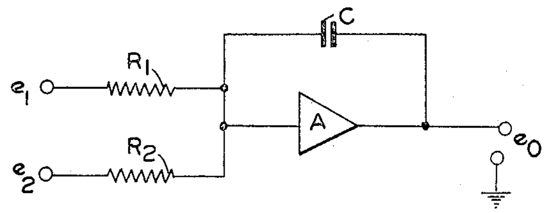
FIG. 1 PRIOR ART
FIG. 1 is an elementary electrical schematic diagram of a prior art electronic integrator circuit.

The basic prior art electronic integrator of FIG. 1 is shown as comprising operational amplifier A, feedback capacitor C and input scaling resistors $R_1$ and $R_2$. Voltages $e_1$ and $e_2$ are assumed to be applied to resistors $R_1$ and $R_2$, respectively. If the gain of amplifier A were infinite, and various other characteristics of the amplifier were perfect, and if capacitor C were a perfect capacitor, an output $e_o$ from the integrator would be in accordance with the following expression:

$$e_0(t)=-\frac{1}{R_1C}\int_0^t e_1dt-\frac{1}{R_2C}\int_0^t e_2dt+e_0(t=0)$$

The actual accuracy is limited, however, by (1) voltage offset in the operational amplifier, (2) current input to the operational amplifier, (3) capacitor leakage resistance, (4) capacitor absorption, and (5) finite amplifier gain, which has an effect equivalent to that of capacitor leakage resistance. Voltage offset in the operational amplifier has the same effect as an equivalent error in the input signals, and in an integrator circuit, such an error obviously is integrated with respect to time, so that a small voltage offset error can result in considerable error in the integrator output voltage if such an integrator input signal is integrated for an appreciable length of time. The accuracy of an operational amplifier depends upon the total current being applied through the input scaling resistors being exactly cancelled by the feedback current and upon no input current flowing in the first stage of the amplifier. In order to minimize amplifier input currents, the first stage of some vacuum-tube amplifiers is operated in a "starved" condition, and in other amplifiers a blocking capacitor is inserted in series with the amplifier input terminal to minimize such currents. Despite such techniques, small input currents of the order of $10^{-4}$ microamperes frequently occur and contribute to computational error. Like voltage offset, the effect of current input error on computation increases with time through integration. The effects which such component limitations have on performance of the overall integrator circuit may be better understood by reference to the equivalent circuit diagram of FIG. 2.

Figures 2, 3:
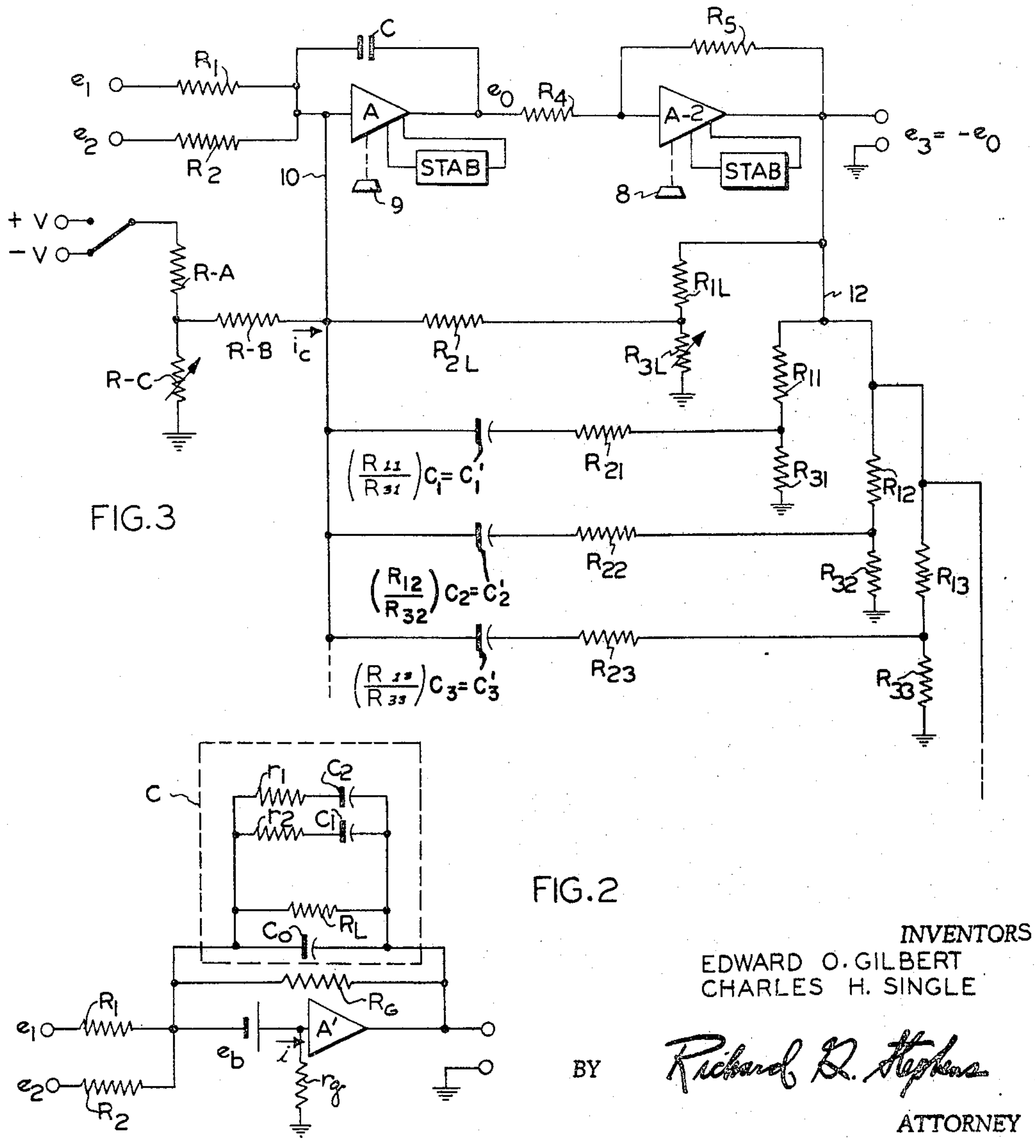
FIG. 2 is a theoretical equivalent circuit diagram of the integrator of FIG. 1, useful in understanding the sources of the computational errors which occur in the operation of the integrator of FIG. 1.
FIG. 3 is an electrical schematic diagram of an improved electronic integrator constructed in accordance with the present invention.

In FIG. 2 amplifier A is assumed to be a perfect amplifier, the voltage offset of the actual amplifier is represented by a small battery source of voltage $e_b$, the current input to the actual operational amplifier as $i$, and the amplifier input impedance to ground is represented by $r_g$. The actual capacitor C of FIG. 1 is represented within dashed lines in FIG. 2 as comprising a basic, or theoretically perfect capacitor $C_0$, together with a plurality of parallel circuits which represent the effects of various limitations of an actual computing capacitor.

Resistance $R_L$ represents capacitor leakage resistance, and resistance $R_G$ represents the effect caused by the actual amplifier gain being less than infinity. The resistance-capacitance combinations of $r_1$, $c_1$, and $r_2$, $c_2$ represent absorption effects of the actual capacitor. More than two such $rc$ branches are necessary to describe absorption effects over a substantial frequency range.

In the prior art it has been common to provide an adjustable balancing control to compensate for voltage offset $e_b$ or current $i$ or a combination of these. Such balancing controls insert a compensating voltage into the operational amplifier. Because integrating error due to amplifier voltage offset depends only upon the number of input resistors connected to the integrator and the amplifier input impedance to ground, such balance controls must be frequently re-adjusted if these two sources of error are to be cancelled as the number and sizes of the input resistors are varied. Such re-adjustment becomes tedious and time-consuming in a computer having many operational amplifiers with varied input configurations.

In the embodiment of the invention shown in FIG. 3 the basic integrator circuit again comprises input scaling resistors $R_1$ and $R_2$, amplifier A and capacitor C, the latter preferably comprising a high quality computing capacitor, but a capacitor still having the various limitations mentioned above. The output voltage $e_o$ from amplifier A is applied via resistance R–4 to a feedback inverter amplifier A–2 having feedback resistor R–5. Inasmuch as R–4 and R–5 are of equal value, inverter amplifier A–2 has unity gain. The remaining circuitry of FIG. 3 is utilized to compensate for the above-mentioned sources of error.

The voltage offset error is minimized in a conventional manner by adjustment of the amplifier A internal balance control, represented by control knob 9. The voltage offset error of inverter amplifier A–2 is compensated for by a similar balance control in A–2 represented by knob 8. Such balance controls commonly comprise a potentiometer circuit which inserts an opposite-sense voltage into the differential amplifier input stage of the amplifier to compensate for voltage offset, the differential amplifier stage usually also being connected to receive a DC stabilization signal from a conventional modulator-amplifier-demodulator channel represented by a simple block STAB in FIG. 3. A variety of other zero-level manual adjustment controls are also well-known and may be used in integrators which incorporate the present invention. See, for example, pages 6–2 et seq. of "Control Engineer's Handbook," McGraw-Hill, N.Y., 1958.

The amplifier A input current error is balanced by an opposite-sign current $i_c$, which is applied to the amplifier A summing junction 10 via resistor R–B from a voltage divider comprising resistors R–A and R–C. The voltage divider is excited by either a plus or minus constant voltage, depending upon the polarity of the current $i_c$ required to cancel the amplifier A input current. Because amplifier input currents are generally quite small, of the order of $10^{-10}$ amperes or less, the generation of an accurate opposite-sense $i_c$ current would require either an extremely high resistance R–B, or an extremely small voltage V if voltage V were connected directly to resistance R–B. By use of the voltage divider comprising resistances R–A and R–C, with the resistance value of R–C being considerably smaller than that of R–A, a voltage V large enough to be accurately measured and a resistance R–B small enough to be easily provided may be utilized. As indicated by the arrow, resistance R–C may comprise a variable rheostat to allow adjustment for very long term input current changes, or for use of the circuit with different amplifiers.

It is important to note that adjustment of the conventional balance control 9 to cancel out voltage offset is done in FIG. 3 entirely independently from the adjustment of the $i_c$ current to cancel out amplifier input current. Because these two sources of error are cancelled out by two independent compensating means, the compensation is correct for any variety of different input configurations, and the adjustments need not be changed when different numbers of input resistors are connected to the integrator summing junction to solve different problems. Thus much better drift performance results for all configurations without re-adjustment of the controls being required. In order to reduce or eliminate error due to capacitor leakage resistance, finite amplifier gain, and capacitor absorption, positive feedback is applied through an impedance network which simulates the capacitor leakage and absorption characteristics and the amplifier finite gain limitation.

In order to decrease or cancel out the effect of the leakage resistance of capacitor C, a positive feedback voltage is applied to the integrator summing junction 10 via resistor $R_{2L}$. The output voltage of inverter amplifier A–2 is applied to excite a voltage divider comprising resistances $R_{1L}$ and $R_{3L}$. The network comprising resistances $R_{1L}$, $R_{2L}$, $R_{3L}$ may be made equivalent to the single resistance $R_L$ of FIG. 2. Thus an input may be applied to the summing junction via resistance $R_{2L}$ which is equal in magnitude and opposite in sign to the leakage input due to the leakage of capacitor C, and hence the effect of the capacitor leakage resistance will be completely cancelled out. In FIG. 2 parallel resistances $R_L$ and $r_g$ may be replaced by a single resistance $R_K$ (not shown). If the $R_{1L}$, $R_{2L}$, $R_{3L}$ network in FIG. 3 is made equivalent to such a resistance the positive feedback input signal applied via resistance $R_{2L}$ will cancel out both the error due to capacitor leakage and the error due to finite amplifier gain. In typical applications, the value of the $R_K$ resistance is of the order of $5\times10^{12}$ ohms; and again a voltage divider ($R_{1L}$, $R_{2L}$) is used both to avoid a requirement for such an extremely high resistor, and to allow accurate adjustment by making resistance $R_{3L}$ an adjustable rheostat.

The absorption current $I_a$ in an imperfect, isotropic dielectric is a current proportional to the rate of accumulation of electric charges within the dielectric. The rate of accumulation, and hence the absorption current, decreases with time after any change of the potential gradient, so that the absorption current is reversible. The absorption current $I_a$ resulting from any change of the potential gradient is a function, $f(t)$, of the time which has elapsed since the change occurred. The absorption current through a plane surface of the area A which is perpendicular to the potential gradient is:

$$I_a=\frac{E_A}{4\pi}\cdot f(t)\frac{dE}{dt}$$

where $f(t)$ must be experimentally determined for a given dielectric and wherein $e$ is the dielectric constant.

Capacitor absorption is due to polarization effects within the capacitor and has two main properties, i.e., an effective variation in capacity with frequency, and an out-of-phase component of dissipation which also varies with frequency. Thus the dielectric constant of a capacitor is actually a complex function: $e^*=e'-je''$.

When expressed in terms of frequency and relaxation time (the time required for polarization to form or disappear), the complex dielectric constant becomes $$e^*=e_\infty\frac{e_0-e_\infty}{1+j\omega\tau_0}$$

where $e_0$ is the zero frequency or static dielectric constant, $e_\infty$ is the infinite frequency dielectric constant, and $\tau_0$ is the relaxation time, which is a function of temperature. Thus the equivalent circuit of an actual capacitor, if one wishes to consider absorption, would appear to consist of an ideal capacitor shunted by a series resistor-capacitor circuit. Experimental results, however, show the equivalent circuit to be more complex, requiring a plurality of capacitor-resistor combinations shunted across the ideal capacitor, suggesting that an actual capacitor may have a plurality of relaxation times, perhaps due to non-homogeneities in the dielectric. A number of techniques for experimentally determining equivalent networks to represent capacitor absorption are known and need not be set forth in detail herein. For example, see ISA paper No. 18.2.62 entitled, "Capacitor Low Frequency Characteristics," published Oct. 16, 1962 by the Instrument Society of America, New York, N.Y., or the doctoral thesis "An Analysis of Certain Errors in Electronic Differential Analyzers," by Paul C. Dow, Jr., University of Michigan, Ann Arbor, Mich., July 1957, page 93 et seq. The absorption compensation network used may be identical to that used to represent the capacitor equivalent circuit, or preferably, as shown, an equivalent network having voltage dividers scaled to allow smaller resistance values and larger capacitors to be used.

In order to cancel out the effects of absorption currents in capacitor C, further positive feedback signals are applied to the summing junction via a plurality of further feedback paths, three of which are shown in FIG. 3, through capacitors $C_1'$, $C_2'$ and $C_3'$, and from three to five such feedback networks are in general necessary to cancel the absorption current $I_a$ over the desired frequency range. The number of series RC networks which one need parallel to provide an equivalent circuit of given accuracy depends entirely upon the frequency range over which one wishes to compensate errors caused by absorption. Because the absorption characteristic of high quality computing capacitors (such as those using polystyrene or Teflon dielectrics) is rather uniform, it is frequently unnecessary that these feedback networks be made adjustable, but for extreme precision, resistors $R_{31}$, $R_{32}$, and $R_{33}$ may comprise adjustable rheostats. It will be seen that the effect of the absorption current in main computing capacitor C will be decreased or cancelled out by an equal but opposite current connected to summing junction 10 through the three parallel positive feedback paths shown. The absorption compensation network (neglecting capacitor leakage) will be seen to comprise a network having a transfer function selected in accordance with the difference between the actual transfer function of the integrating capacitor C (omitting the leakage resistance) and the transfer function of an ideal capacitor. Thus the positive feedback through the absorption compensation network will apply a feedback signal to the amplifier to substantially cancel out the errors which otherwise arise due to capacitor absorption. Only the effects of the error portions of the integrating capacitor equivalent circuit are cancelled out, providing integration as if the integrating capacitor were theoretically perfect.

It will be seen that the integrator output $e_3$ present at the output circuit of amplifier A–2 in FIG. 3 is desirably presented from a low impedance circuit which may be used to drive other circuits directly. In fact, amplifiers A and A–2 provide plus and minus low impedance outputs. Thus amplifiers A and A–2 comprise a bi-polar amplifier, i.e., one which provides two output signals of equal magnitude and opposite polarity. While the increased accuracy obtainable with the present invention makes temperature control less necessary, the relaxation time or times of the capacitor dielectric are a function of temperature, as mentioned above, and because the temperature coefficient of the capacitor is not removed or compensated by the present invention, temperature control is still advantageous.

While resistances R–4 and R–5 are shown as equal resistances, so that inverting amplifier A–2 has unity gain, it should be noted that other values of gain (either greater or less than unity) may be provided with appropriate scaling changes in the compensating positive feedback networks. For example, if resistance R–4 were halved, giving amplifier A–2 a gain of 2.0, voltage divider resistors $R_{3L}$, $R_{31}$, $R_{32}$ and $R_{33}$ should be halved, and the factor of 2.0 scaling thereafter kept in mind if the circuit output is taken from amplifier A–2.

Figures 4, 5, 6A, 6B, 6C:
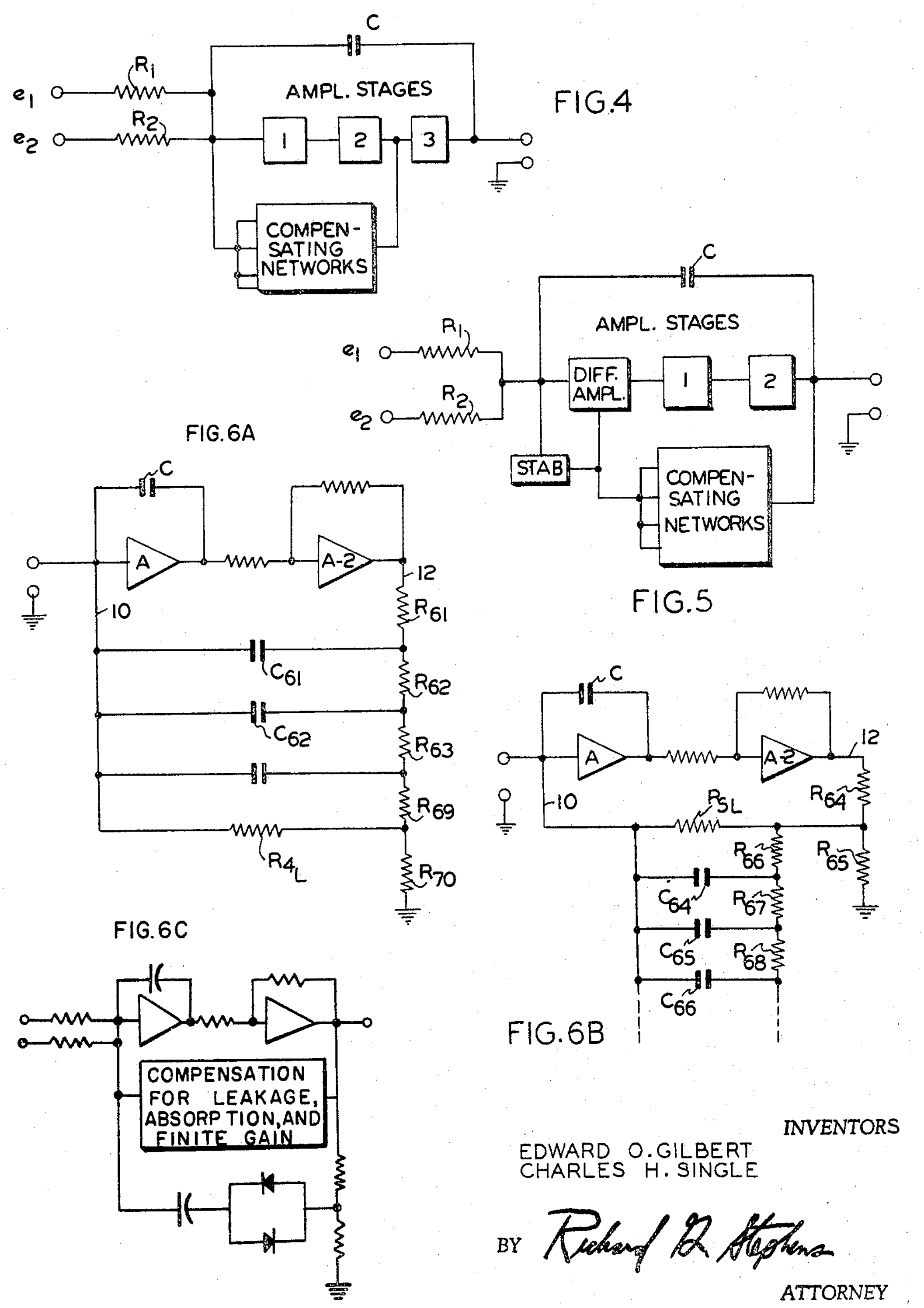
FIGS. 4, 5, 6A, 6B and 6C illustrate portions of alternative embodiments of the invention.

While FIG. 3 shows the use of an additional amplifier A–2 to provide a positive feedback voltage, it also is within the scope of the invention to provide the necessary positive feedback voltage by other known means. For example, basic amplifier A usually will comprise a plurality of stages, and if desired, the positive feedback voltage required to excite the four voltage dividers shown connected to line 12 in FIG. 3 sometimes may be conveniently obtained internally from within amplifier A. Such an arrangement is illustrated in FIG. 4, wherein the basic amplifier (corresponding to A in FIG. 3) is assumed to comprise three inverting stages, and the positive feedback voltage is shown derived from the second stage. In such an arrangement, of course, the compensating circuit values must be altered to take into account the smaller voltage derived from the second stage of the amplifier, in order that the same compensating currents be applied to the input summing junction.

While FIGS. 3 and 4 show the compensating signals being applied to the input summing junction of the operational amplifiers, it also is within the scope of the invention to otherwise apply the positive feedback compensating signals. In FIG. 5 the first stage of the operational amplifier is shown as comprising a conventional differential amplifier having two separate input lines, and as above, the second and third stages are assumed to invert. Differential input stages are commonly provided in dual channel amplifiers in order that the DC level or "drift correction" signal from the stabilization amplifier (STAB) channel may be introduced into the main amplifier channel. As shown in FIG. 5, the compensating signals from the compensating networks may be applied to the differential amplifier second input line, thereby resulting in positive feedback. As will now be apparent, the leakage compensation network may be connected in accordance with one of the above-described positive feedback connections while the absorption compensation network is connected in accordance with a different one of the positive feedback connections, if desired.

Furthermore, while the absorption compensation network has been shown in FIG. 3 as comprising a plurality of parallel-connected branches each including a capacitor and a resistance, various equivalent circuits will be readily apparent to those skilled in the art as a result of this disclosure. For example, the amplifier voltage utilized to drive the compensating network may be applied directly to a voltage divider (R–61, R–62, R–63, $R_{69}$, $R_{70}$) as shown in FIG. 6*a*, or instead to a second voltage divider (R–66, R–67, R–68) from a first voltage divider (R–64, R–65) as shown in FIG. 6*b*. It should be clearly understood that though not shown, that conventional "stabilizing" channels may be used with the arrangements of FIGS. 4, 6*a* and 6*b*, and that the current input compensation circuit (R–A, R–B, R–C) and separate voltage offset balance controls (8, 9) of FIG. 3 may be used as well with the arrangements shown in FIGS. 4, 5, 6*a* and 6*b*. Also, it should be noted that the invention is applicable as well to integrators utilizing single-channel or unstabilized amplifiers as well as the more usual stabilized amplifiers.

While the invention has been described in connection with capacitor absorption and leakage compensation and amplifier finite gain compensation, it is important to note that further integrator errors may be compensated for by provision of further elements in the positive feedback network, so that the positive feedback network has an error transfer function as close as possible to the difference between the uncompensated integrator transfer function and $1/p$, the transfer function of an ideal integrator. In order to compensate for the computing capacitor temperature coefficient a further parallel branch (not shown) may be provided in the positive feedback network, with such further branch comprising a small capacitor chosen to have a high temperature coefficient. For example, if a 1.0 mfd. computing capacitor were ordinarily used to provide a given time constant, one may instead use a 1.01 mfd. capacitor and provide a .01 mfd. capacitor having a much higher (100 times) temperature coefficient in the positive feedback network. The capacity of the large computing capacitor then will be seen to be greater than that of the small compensating capacitor by the same factor $n$ as that by which the temperature coefficient of the small capacitor exceeds that of the large computing capacitor, where the selected constant $n$ equals 100 in the example given. At a reference temperature the capacities of the two capacitors will subtract to provide the desired overall time constant. As the temperature varies, the high percentage variation in the small capacitor will cancel out the low percentage variation of the large capacitor. In order to compensate for capacitor voltage coefficient, one may use a further small capacitor having a large voltage coefficient (such as a well-known varicap or voltage-sensitive capacitor) in similar manner in the positive feedback network, again choosing the main computing capacitor size so as to cancel out the capacity of the added voltage-sensitive capacitor at a reference temperature. A small capacitor which has sufficiently high temperature coefficient and voltage coefficient could be used for both temperature compensation and voltage coefficient compensation. Rather than using a voltage-variable capacitor in the positive feedback network, one may instead apply the positive feedback voltage to a voltage divider, and then to a capacitor having a normal voltage coefficient through a pair of oppositely-poled diodes connected in parallel, so that the increase in capacity of the diodes as the voltage applied to them increases in either direction compensates out the voltage coefficient of the main computing capacitor. Such an arrangement is disclosed in FIG. 6*c*.

The remarkable improvement in integration obtained by the present invention is illustrated by the following comparison between the best presently-available prior art electronic integrators and one embodiment of the present invention.

| | |
|---|---|
| Drift less than $10\mu$ volts/second over entire computer range ($\pm 100$ volts) for integrator using 1.0 fd. capacitor. | Drift ranging from $67\mu$ volts/second at zero volts to $120\mu$ volts/second at $\pm 100$ volts, for integrator using 1.0 fd. capacitor. |
| Effective DC leakage greater than $(10)^{14}$ ohms. | $5\times10^{12}$ ohms. |
| Effective dissipation factor less than $2\times10^{-5}$. | Factor ranges from 1.5 to $2\times10^{-4}$. |
| Sine wave computation with damping factor less than $2\times10^{-5}$ for frequencies below 200 c.p.s. | $2\times10^{-4}$ for frequencies below 200 c.p.s. |
| Capacity variation with frequency less than 0.002% per decade. | 0.02% per decade. |
| Transient variation due to history (dielectric absorption) less than 0.007%. | 0.07%. |
| All combined errors (worst case transient and history conditions) within 0.01%. | 0.1%. |

The above listed performance characteristics for one specific embodiment of the invention are based on an example using a polystyrene capacitor wherein the absorption compensation networks were separated by frequency factors of about 30. Theoretically there is no limit to the perfection with which dissipation factor cancellation may be performed. By using a greater number of RC circuits, separated by frequency factors of approximately 10, for example, the effective polystyrene capacitor dissipation factor may be reduced to a factor of approximately$10^{-5}$.

It will thus be seen that we have provided an improved electronic integrator capable of unprecedented long-term stability and accuracy.

It will thus be seen that the objects set forth above, among those made apparent from the preceding description, are efficiently attained, and since certain changes may be made in the above constructions without departing from the scope of the invention, it is intended that all matter contained or shown in the accompanying drawings shall be interpreted as illustrative and not in a limiting sense.

Having described our invention, what we claim as new and desire to secure by Letters Patent is:

1. An electronic integrator circuit, comprising, in combination: an electronic amplifier having an input terminal, first and second amplifying means, and an output terminal, said first amplifying means having an input circuit connected to said input terminal, said first amplifying means having an output circuit, said second amplifying means having an input circuit connected to the output circuit of said first amplifying means and said second amplifying means having an output circuit connected to said output terminal, said first and second amplifying means collectively providing polarity inversion between said input and output terminals; a first capacitor connected between said input and output terminals; and a feedback impedance means connected between the output circuit and the input circuit of said first amplifying means to apply a positive feedback signal from the output circuit to the input circuit of said first amplifying means, said feedback impedance means including a resistance-capacitance network having a transfer function commensurate with the dielectric absorption characteristic of said first capacitor.

2. An electronic integrator circuit according to claim 1 in which said feedback impedance means includes a resistive circuit branch connected between the output circuit and the input circuit of said first amplifying means.

3. An electronic integrator circuit according to claim 1 in which said resistance-capacitance network comprises a resistive voltage divider means connected to the output circuit of said first amplifying means, said voltage divider means having a tap terminal, and a capacitance means and a further resistance connected in series between said tap terminal and said input circuit of said first amplifying means.

4. An integrator circuit according to claim 1 in which said resistance-capacitance network comprises voltage divider means connected to the output circuit of said first amplifying means, said voltage divider means having a plurality of tap terminals, and a plurality of capacitance means connected between respective tap terminals and said input circuit of said first amplifying means.

5. An integrator circuit according to claim 1 in which said feedback impedance means includes a second capacitor, said first capacitor having a capacity which is $n$ times the capacity of said second capacitor, said second capacitor having a temperature coefficient which is substantially $n$ times the temperature coefficient of said first capacitor, where $n$ is a selected constant.

6. An integrator circuit according to claim 1 in which said feedback impedance means includes a second capacitor, said first capacitor having a capacity which is $n$ times the capacity of said second capacitor, said second capacitor having a voltage coefficient which is substantially $n$ times the voltage coefficient of said first capacitor, where $n$ is a selected constant.

7. An integrator circuit according to claim 2 in which said resistive circuit branch comprises voltage divider means connected to said output circuit of said first amplifying means, said voltage divider means having a tap terminal; and a further resistance connected between said tap terminal and said input circuit of said first amplifying means.

8. An electronic integrator circuit, comprising, in combination: an electronic amplifier having an input terminal, an output terminal and a plurality of cascaded direct-coupled amplifying stages connected between said input and output terminals, a first of said amplifying stages comprising a difference amplifier stage having a first input circuit connected to said amplifier input terminal and a second input circuit; a first capacitor connected between said input and output terminals of said amplifier; and a feedback impedance means connected between said output terminal of said amplifier and said second input circuit of said difference amplifier stage to apply a positive feedback signal to said difference amplifier stage, said feedback impedance means including a resistance-capacitance network having a transfer function commensurate with the dielectric absorption characteristic of said first capacitor.

9. An integrator circuit according to claim 8 having a drift-stabilizer amplifier channel connected between said first and second input circuits of said difference amplifier stage.

References Cited

UNITED STATES PATENTS 2,891,174 6/1959 Hawkins ----------- 307—229

OTHER REFERENCES

Korn and Korn—Electronic Analog Computers (second edition), 1956, pages 178 and 184–187.

MALCOLM A. MORRISON, Primary Examiner

FELIX D. GRUBER, Assistant Examiner

U.S. Cl. X.R.

307—229; 328—127, 162